(12) United States Patent
Nakamura et al.

(10) Patent No.: US 6,727,967 B2
(45) Date of Patent: Apr. 27, 2004

(54) TRANSELECTIVE LCD IN WHICH REFLECTED LIGHT PASSES THROUGH COLOR FILTERS TWICE, TRANSMITTED LIGHT PASSES THROUGH COLOR FILTER ONLY ONCE, BUT ALSO PASSES THROUGH ADDITIONAL LAYER OF CHOLESTERIC LIQUID CRYSTAL OR BAND-PASS FILTER

(75) Inventors: Takashi Nakamura, Kumagaya (JP); Yoshinori Higuchi, Yokohama (JP); Yuzo Hisatake, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 66 days.

(21) Appl. No.: 10/194,289

(22) Filed: Jul. 15, 2002

(65) Prior Publication Data

US 2002/0171794 A1 Nov. 21, 2002

Related U.S. Application Data

(63) Continuation-in-part of application No. 09/418,602, filed on Oct. 15, 1999, now abandoned.

(30) Foreign Application Priority Data

Oct. 15, 1998 (JP) .......................................... 10-293374
Oct. 22, 1998 (JP) .......................................... 10-301221

(51) Int. Cl.$^7$ .......................................... G02F 1/1335
(52) U.S. Cl. ..................... 349/114; 349/106; 349/115
(58) Field of Search ................................. 349/106, 114, 349/115

(56) References Cited

U.S. PATENT DOCUMENTS

| | | | | |
|---|---|---|---|---|
| 5,737,045 A | * | 4/1998 | Abileah | 349/104 |
| 5,841,494 A | * | 11/1998 | Hall | 349/98 |
| 5,982,464 A | * | 11/1999 | Wang et al. | 349/108 |
| 6,300,929 B1 | | 10/2001 | Hisatake et al. | 345/94 |
| 6,437,840 B1 | * | 8/2002 | Arikawa et al. | 349/62 |
| 6,621,543 B2 | * | 9/2003 | Moon | 349/115 |

* cited by examiner

Primary Examiner—Tarifur R. Chowdhury
Assistant Examiner—Andrew Schechter
(74) Attorney, Agent, or Firm—Pillsbury Winthrop LLP

(57) ABSTRACT

A phase difference plate and a liquid-crystal layer are provided between a polarizing plate and a selective reflection layer formed of cholesteric liquid crystal. A first color filter layer is provided on the polarizing plate side of the selective reflection layer. On the back side of the selective reflection layer, a second color filter layer is arranged. On the back side of the second color filter layer, a backlight is provided. When a liquid-crystal display device functions as a reflective liquid-crystal display device, light entering through the polarizing plate is reflected totally by the selective reflection layer and passes through the first color filter layer twice. When the liquid-crystal display device functions as a transmission liquid-crystal display device, light from the backlight passes through the selective reflection layer. Then, the light passes through the second and first color filter layers once and is outputted.

20 Claims, 9 Drawing Sheets

TRANSELECTIVE LCD IN WHICH REFLECTED LIGHT PASSES THROUGH COLOR FILTERS TWICE, TRANSMITTED LIGHT PASSES THROUGH COLOR FILTER ONLY ONCE, BUT ALSO PASSES THROUGH ADDITIONAL LAYER OF CHOLESTERIC LIQUID CRYSTAL OR BAND-PASS FILTER

CROSS-REFERENCE TO RELATED APPLICATIONS

This is a Continuation-in-Part Application of U.S. patent application Ser. No. 09/418,602, filed Oct. 15, 1999, now abandoned, the entire contents of which are incorporated herein by reference.

BACKGROUND OF THE INVENTION

1. Field of the Invention

The present invention relates to a color cathode-ray tube having a shadow mask.

This invention relates to a color liquid-crystal display device with a color filter layer, and more particularly to a half-transmission color liquid-crystal display device which has a backlight and a reflecting plate for reflecting external light and can function as a reflective/transmission color liquid-crystal display device.

2. Description of the Related Art

In recent years, liquid-crystal display devices have been applied in various forms, including the displays of notebook-type computers, monitors, car navigation systems, function electronic calculators, and medium- and small-sized TV sets. Since the reflective liquid-crystal display device requires no backlight, the application of the display device to the displays on portable devices, such as mobile PCs, has been studied because of the advantages of less power consumption, thinness, and lightness.

Like a sheet of paper, a conventional reflective liquid-crystal display device displays images with the help of external light. Therefore, when the device is used in a dark environment, the display screen becomes dark, which makes it difficult to view the image on the screen. Particularly in the darkness, it cannot be used at all.

To overcome this problem, a half-transmission liquid-crystal display device has been developed which includes a half-transmission reflecting plate, such as a half mirror, and a backlight so that it may function as a transmission liquid-crystal display device using the backlight in a dark environment.

In addition, a half-transmission liquid-crystal display device has been studied which has pinholes made in the reflecting plate in such a manner that the pinholes correspond to the individual pixels and which has microlenses provided for the pixels in a one-to-one ratio. When this liquid-crystal display device is used as a reflective liquid-crystal display device, the brightness of the screen display decreases only as much as there are pinholes in comparison with an ordinary reflection liquid-crystal display device. When it is used as a transmission liquid-crystal display device, the brightness of the display screen similar to that of an ordinary transmission liquid-crystal display device can be obtained by gathering the light emitted from the backlight with the microlenses and allowing the rays of the light to pass through the pinholes. This improves the brightness of the aforementioned half-transmission liquid-crystal display device.

Use of a color filter layer enables such a half-transmission liquid-crystal display device to provide a color display.

Specifically, a conventional half-transmission color liquid-crystal display device is constructed by laying a polarizing plate, a front substrate, a color filter layer, driving electrodes, a liquid-crystal layer, a back substrate, a half reflecting plate, and a backlight one on top of another in that order. The color filter layer is provided in front of the reflecting plate, that is, on the side of the observer.

Therefore, when the liquid-crystal display device is used as the reflective type, external light entered through the front substrate passes through the color filter layer and liquid-crystal layer, then is reflected by the reflecting plate, and passes through the liquid-crystal layer and color filter layer again, and thereafter goes outside. Namely, the light passes through the color filter twice. Therefore, like an ordinary reflective color liquid-crystal display device, the color filter layer used has such a spectral characteristic as provides the desired coloring when light has passed through the color filter layer twice.

When the device functions as a reflective liquid-crystal display device, the light source is external light and the intensity of the light cannot be controlled freely. Additionally, when the polarizing plate is used, the transmittance of the entire liquid crystal element is insufficient. Therefore, the spectral characteristic of the color filter layer has a minimum transmittance of 0.1 or more, with the maximum transmittance being 1. Consequently, the spectral characteristic of such a color filter layer has been designed to provide so low color density that only one pass of light through the color filter layer cannot effect sufficient coloring.

Actually, the color filter layer has such a spectral characteristic as provides lower color density than that of the spectral characteristic of a RGB color filter layer used in a conventional transmission liquid-crystal display device, even after light has passed through the color filter layer twice.

On the other hand, when the half-transmission liquid-crystal display device is used as the transmission type, light emitted from the backlight passes through the color filter layer only once. As a result, the spectral characteristic of the display when the device functions as the transmission type, is the spectral characteristic when light has passed through the color filter layer once, or the spectral characteristic of the color filter layer itself. As a result, use of the aforementioned color filter layer provides very low color density.

Conversely, in a case where the half-transmission liquid-crystal display device uses a color filter layer whose spectral characteristic is the same as that of a color filter used in a conventional transmission liquid-crystal display device, when the device function as the reflective type, the brightness of the display is lacking seriously.

As described above, with the conventional half-transmission color liquid-crystal display device, the device provides only one of the following optical characteristics: when the device functions as the reflective type, the brightness of the display decreases seriously, or when the device functions as the transmission type, the color density of the display gets lower significantly.

BRIEF SUMMARY OF THE INVENTION

The present invention is contrived in consideration of the above circumstances and its object is to provide a half-transmission liquid-crystal display device capable of making a sufficiently bright display with sufficient color density even when the device functions as the reflective type or as the transmission type.

The foregoing object is accomplished by providing a liquid-crystal display device comprising: a front substrate and a back substrate which are arranged to face each other and on an inner surface of each of which a liquid-crystal driving electrode is provided; a liquid-crystal layer sandwiched between the front substrate and the back substrate, for modulating the phase of incident light according to an applied voltage; a phase difference plate and a polarizing plate with a polarizing axis which are provided in that order on an outer surface of one of the front and back substrates; a half-transmission, half-reflection layer formed on the other substrate; a color filter layer arranged closer to the front substrate than the half-transmission, half-reflection layer; a backlight arranged on the back side of the other substrate; and a cholesteric liquid-crystal layer arranged between the half-transmission, half-reflection layer and the backlight, for selectively reflecting light with wavelengths lying between adjacent peak wavelengths in a spectral transmittance characteristic of the color filter layer.

In the typical structure of the liquid-crystal display device according to the present invention, the polarizing plate, phase difference plate, color filter layer, optical phase modulation liquid-crystal layer functioning as a variable retarder layer, selective reflection layer, and cholesteric liquid-crystal layer for selectively reflecting and transmitting the light from the backlight are provided in that order when viewed from the observer side. The cholesteric liquid-crystal layer adapts the wavelength characteristic of the backlight to the spectral transmittance characteristic of the color filter layer. Specifically, the cholesteric liquid-crystal layer selectively reflects and cuts off wavelengths between peak wavelengths of the color filter layer, thereby adjusting the emission spectrum of the backlight.

The foregoing object is further accomplished by providing a liquid-crystal display device comprising: a front substrate and a back substrate which are arranged to face each other and on an inner surface of each of which a liquid-crystal driving electrode is provided; a liquid-crystal layer sandwiched between the front substrate and the back substrate, for modulating the phase of incident light according to an applied voltage; a phase difference plate and a polarizing plate with a polarizing axis which are provided in that order on an outer surface of one of the front and back substrates; a selective reflection layer which is arranged on the other substrate and which reflects a first circularly polarized light of incident light and transmits a second circularly polarized light rotating in the opposite direction to that of the first circularly polarized light; a first color filter layer arranged closer to the front substrate than the selective reflection layer; a backlight arranged on the back side of the back substrate; and a band-pass filter arranged closer to the backlight than the selective reflection layer.

When the liquid-crystal display device functions as the reflective type, the incident light passes through the first color filter layer twice, the spectral transmittance characteristic of the first color filter layer is so set that the light passed through twice is colored in the desired color. Therefore, the spectral transmittance characteristic of the first color filter layer becomes a relatively wide band characteristic.

When the liquid-crystal display device functions as the transmission type, because the light from the backlight passes through the first color filter layer only once, a display characteristic with the brightness and color density similar to those of a conventional transmission color liquid-crystal display device can be obtained by causing the light to pass through the band-pass filter to narrow the band of the light before the light enters the first color filter.

An interference filter or a second color filter layer composed of a color absorption filter may be used as the band-pass filter. A dielectric multilayer film constructed by staking dielectrics one on top of another may be used as the interference filter. A filter obtained by adding pigment or dye to an organic medium may be used as the color absorption filter.

When the selective reflection layer is formed on the inner surface of the back substrate and the color absorption filter is placed under the selective reflection layer, this prevents the parallax due to the thickness of the substrate, which prevents the color density from decreasing due to color shift.

When the second color filter layer is provided on the array substrate with active elements, such as thin-film transistors, the pixel electrodes are formed above the scanning lines, signal lines, and thin-film transistors. Therefore, the second color filter layer is also used as an interlayer insulating film, which realizes a high numerical aperture.

Furthermore, when pigment is dispersed throughout or mixed into the selective reflection layer made of cholesteric liquid-crystal polymers, the selective reflection layer can function as the second color filter layer. This makes it possible to cause a single layer to function as both the selective reflection layer and second color filter layer, which reduces the number of layers in the liquid-crystal display device on the whole.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiment of the invention, and together with the general description given above and the detailed description of the embodiment given below, serve to explain the principles of the invention.

DETAILED DESCRIPTION OF THE INVENTION

Figure 1:
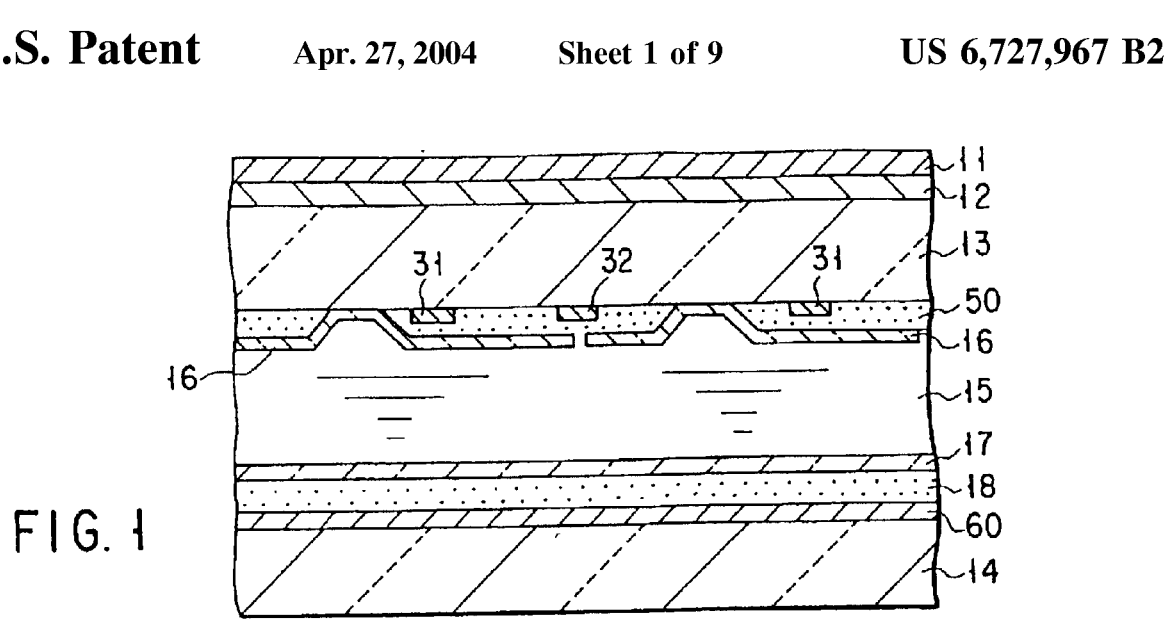
FIG. 1 is a sectional view of a liquid-crystal display device according to a first embodiment of the present invention.
Figure 2:
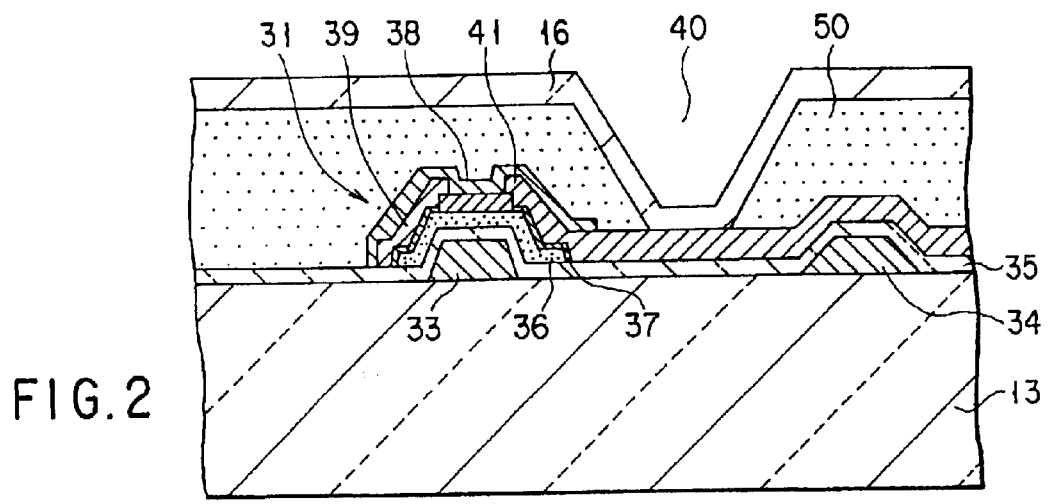
FIG. 2 is an enlarged sectional view of the array substrate of the liquid-crystal display device.
Figure 3:
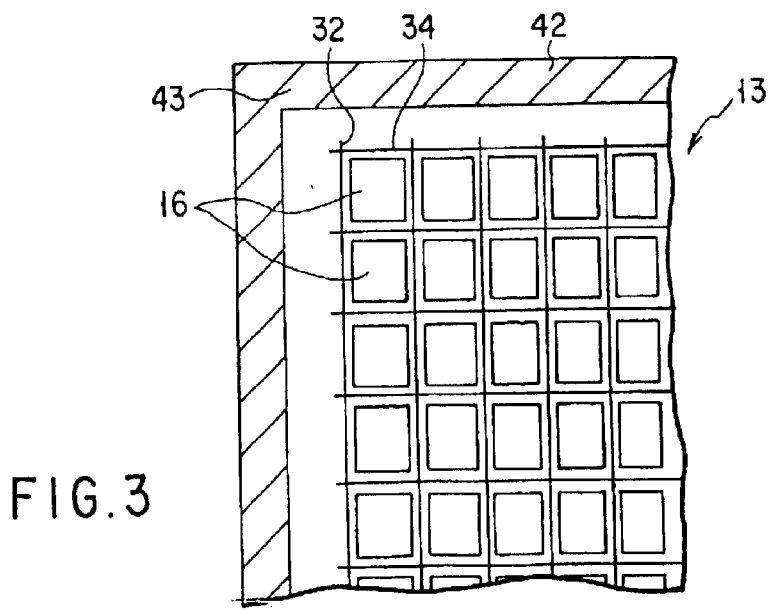
FIG. 3 is a schematic plan view of the array substrate.

Hereinafter, referring to the accompanying drawings, a half-transmission liquid-crystal display device according to a first embodiment of the present invention will be explained.

The basic configuration of a liquid-crystal display device 10 according to the first embodiment will be explained. As shown in FIGS. 1 to 4A, the liquid-crystal display device 10 comprises a polarizing plate 11, a phase difference plate 12, a color filter layer 50, an optical phase modulation twisted nematic (hereinafter, referred to as TN) liquid-crystal layer 15, a selective reflection layer 18 functioning as a half-transmission half-reflection layer, a cholesteric liquid-crystal layer 60, and a backlight 24, which are arranged in that order when viewed from the observation side.

The liquid-crystal display device 10 further comprises a TN liquid-crystal element. The TN display element is formed by sandwiching the TN liquid-crystal layer 15 between two glass substrates 13 and 14 provided so as to face each other. On the observation side of the TN display element, that is, on the outer surface of the glass substrate 13, the phase difference plate 12 and polarizing plate 11 are arranged in that order. A phase difference plate 25, a polarizing plate 26, and the backlight 24 are arranged in this order to oppose the outer surface of the other glass substrate 14. The phase difference plate 12 functions as a fixed retarder layer and the TN liquid-crystal layer 15 functions as a variable retarder layer. The fixed and variable retarder layers constitute a variable retarder.

The glass substrate 13 on the observation side of the TN liquid-crystal element constitutes an array substrate. On the inner surface of the glass substrate 13, the color filter layer 50 is provided, on which a large number of pixel electrodes 16 composed of transparent conductive layer such as ITO are arranged in a matrix form. On the glass substrate 13, signal lines 32 and scanning lines 34 including gate electrodes 33 are further provided in a matrix manner. In addition, auxiliary capacitance electrodes (not shown) are provided, if necessary. At the intersections of the signal lines 32 and scanning lines 34, thin-film transistors (hereinafter, referred to as TFTs) 31 are provided as switching elements, which are connected to the respective pixel electrodes 16.

An oxide film 35 is formed on the signal lines 32 and scanning lines 34. Each TFT 31 includes a semiconductor film 36 made of amorphous silicon (a-Si) provided on the gate electrode 33 via the oxide film 35, a source electrode 41, and a drain electrode 39, the last two provided via a low-resistance semiconductor film 37 on the semiconductor film. The TFT 31 is covered with a passivation film 38. Each pixel electrode 16 is connected to the source electrode 41 through an about 10-$\mu$m-square contact hole 40 formed in the color filter layer 5.

Figure 6:
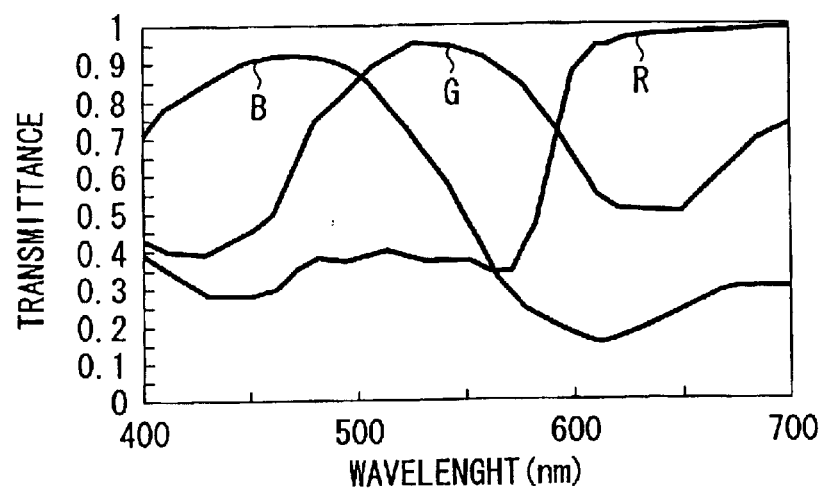
FIG. 6 shows a spectral characteristics of the color filter layer in the liquid-crystal display device.

The color filter layer 50 is provided all over the surface of the pixel section. The color filter layer 50 is composed of color filter layers of the three primary colors, red, green, and blue, or of the three complementary colors, yellow, magenta, and cyan. Pixel electrodes 16 arranged in a matrix form and an opposite electrode 17 provide electric field control of the TN liquid-crystal layer 15 on a pixel basis, thereby making a color display by additive primaries. The spectral characteristic of the color filter layer 50 is such that the layer 50 has a high transmittance as shown in FIG. 6 (the transmittance, the Y value in the CIE-XYZ calorimetric system, is 40% or more). In this case, when images are displayed in the light out of doors by using external light as a light source without turning on the backlight, the luminance of the displayed images is increased, which is desirable.

On the other hand, the glass substrate 14 on the back side of the TN liquid-crystal element constitutes the opposite substrate. The opposite electrode 17 formed of a transparent conductive layer, such as ITO, are formed on the surface facing the pixel electrodes 16 of the glass substrate 14 so as to cover all over the surface. Between the glass substrate 14 and opposite electrode 17, the selective reflection layer 18 and a cholesteric liquid-crystal layer 60 are provided. The selective reflection layer 18 takes the form of a film obtained by polymerizing cholesteric liquid crystal and functions as a half-transmission, half-reflection layer.

It is desirable that the opposite electrode 17 should be made by effecting film formation and patterning simultaneously by usual mask sputtering techniques. In this case, while the opposite electrode 17 is being formed, the process load on the cholesteric liquid-crystal layer 60 can be made very small.

Alignment layers (not shown) are formed on those surfaces of the array substrate and the opposite substrate, which are facing the TN liquid-crystal layer 15. They are formed in such a manner that their alignment axes cross each other at right angles, with the result that the twist angle of the TN liquid-crystal molecules is 90°.

The array substrate and opposite substrate are laminated together with a sealing material 43 applied along the periphery (sealing section) 42 of each of the substrates.

The backlight 21 arranged on the back side of the glass substrate 14 includes a light guide member 22 composed of a light-passing flat plate, such as an acrylic plate, a linear light source 24 arranged on the side of the light guide member, and a diffusion reflection layer 23 provided on the back of the conducting member.

A more detailed configuration of the liquid-crystal display device 10 will be explained together with the operating principle.

Figure 5:
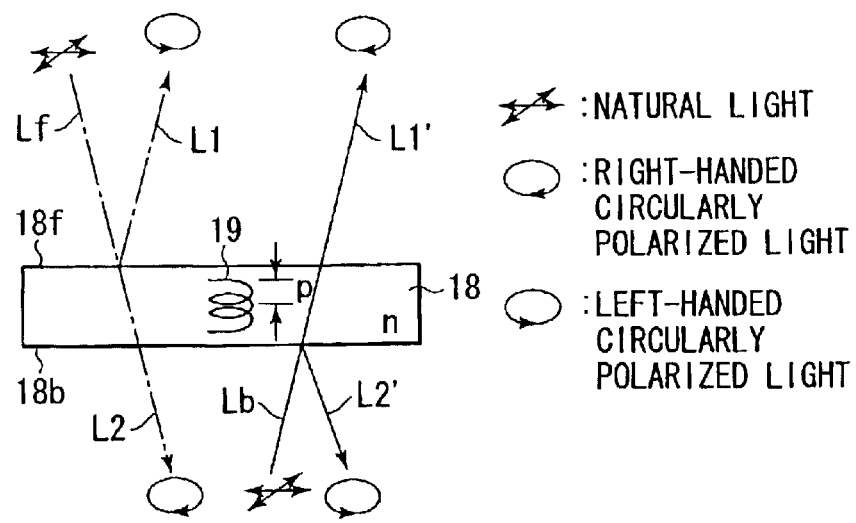
FIG. 5 pictorially shows the operating principle of the selective reflection layer in the liquid-crystal display device.

As shown in FIG. 5, the selective reflection layer 18 made of cholesteric liquid crystal has the function of reflecting only the left-handed circularly polarized light component or right-handed circularly polarized light component of the incident light arriving at one main surface of the layer 18 and transmitting the left-handed circularly polarized light component or right-handed circularly polarized light component rotating in the opposite direction to that of the reflected component and of reflecting only the left-handed circularly polarized light component or right-handed circularly polarized light component of the incident light arriving at the other main surface of the layer 18 and transmitting the left-handed circularly polarized light component or right-handed circularly polarized light component.

It is assumed that the cholesteric liquid crystal constituting the selective reflection layer 18 is such that the np value obtained by multiplying the twist pitch p of the liquid crystal molecule 19 by the average refractive index n is equal to the wavelength $\lambda$ of the incident light. When the liquid-crystal molecules 19 have a counterclockwise helical structure when viewed from the observation side, the left-handed circularly polarized light component of the external light Lf entering at its main surface 18f side is reflected by the main surface 18f. When viewed from the main surface 18f side, the reflected light L1 makes a left-handed circularly polarized light. The light L2 of the right-handed circularly polarized light component of the incident light Lf on the main surface 18f passes through the layer 18 toward the other main surface 18b side.

The cholesteric liquid crystal has the function of selectively reflecting ideally 100% but actually about 90% of the circularly polarized light component in the same direction (i.e., clockwise or counterclockwise direction) as the helical direction (i.e., clockwise or counterclockwise direction) of the liquid crystal molecules when the np value is equal to the wavelength $\lambda$ of the incident light.

On the other hand, of the external light Lb entering at the other main surface 18b, the left-handed circularly polarized light component with respect to the traveling direction reflected by the main surface 18b and makes light L2' of the left-handed circularly polarized light component, whose rotation has been reversed in direction with respect to the traveling direction. Of the external light Lb, the right-handed circularly polarized light component with respect to the traveling direction passes through the selective reflection layer 18 and comes out from the main surface 18a. When viewed from the main surface 18f side, it makes light L1' of the right-handed circularly polarized component.

With the liquid-crystal display device including the selective reflection layer 18, when external light Lf enters the observation surface side, the linearly polarized light component oscillating in the direction along the polarizing axis of the polarizing plate 11 is extracted and arrives at the variable retarder composed of the phase difference plate 12 and liquid-crystal layer 15. The variable retarder, which has the function of varying the amount of phase difference in light, is preferably formed of a fixed retarder (phase difference plate 12) and a variable retarder (liquid-crystal layer 15). The fixed retarder delays the phase of the oscillating component in a specific direction of the incident light for $\lambda/4$ ($\lambda$: incident light wavelength) with respect to the oscillating component perpendicular to that in the specific direction. The variable retarder layer relatively delays the phase of the oscillating component in the specific direction of the incident light for $\lambda/2$ with respect to the oscillating component perpendicular to that in the specific direction.

A known $\lambda/4$ phase difference plate may be used as the fixed retarder layer. With its delaying phase axis having an angle of 45° in a specific direction to the polarizing axis of the polarizing plate 11, the fixed retarder layer converts the linearly polarized light passed through the polarizing plate 11 into circularly polarized light in a specific direction of rotation. With the delaying phase axis of the phase difference plate 12 having an angle of 45° clockwise to the polarizing axis of the polarizing plate 11, the circularly polarized light emitted has a clockwise polarity. Conversely, with the delaying phase axis of the phase difference plate 12 having an angle of 45° counterclockwise to the polarizing axis of the polarizing plate 11, the circularly polarized light emitted has a counterclockwise polarity.

A known TN liquid-crystal layer 15 may be used as the variable retarder layer. When the power supply 20 applies a voltage (first voltage) equal to or lower than a threshold value to the liquid-crystal layer 15, or when the liquid-crystal layer 15 maintains the initial alignment, the liquid-crystal layer 15 delays the oscillating component in the specific direction of the incident light for $\lambda/2$ with respect to the oscillating component perpendicular to that in the specific direction. As a result, the direction of rotation of the circularly polarized light incident on the layer 15 is reversed. When a voltage (second voltage) higher than a saturated voltage is applied to the TN liquid-crystal layer 15 and the twist state of the liquid-crystal molecules is collapsed, the polarity of the circularly polarized light remains unchanged because the incident light is emitted without phase modulation.

As described above, when the variable retarder layer is composed of the TN liquid-crystal layer 15, the relative phase delay caused by the liquid-crystal layer 15 between the application of the first voltage and that of the second voltage is $\lambda/2$. The variable retarder layer is not restricted to the TN liquid-crystal layer. For instance, it may be ferroelectric liquid crystal that delays the phase of the incident light for $\lambda/4$ in the initial alignment state under the application of the first voltage and advances the phase of the incident light by $\lambda/4$ under the application of the second voltage higher than the saturated voltage.

In the liquid-crystal display device 10, for example, when a $\lambda/4$ phase difference plate with a delaying phase axis crossing the polarizing axis of the polarizing plate 11 at a clockwise angle of about 45° is used as the phase difference plate 12 and the selective reflection layer 18 made of left-twisted cholesteric liquid crystal is used, the linearly polarized light passed through the polarizing plate 11 and arrived at the phase difference plate 12 is converted into right-handed circularly polarized light, which is then outputted.

Figure 4A:
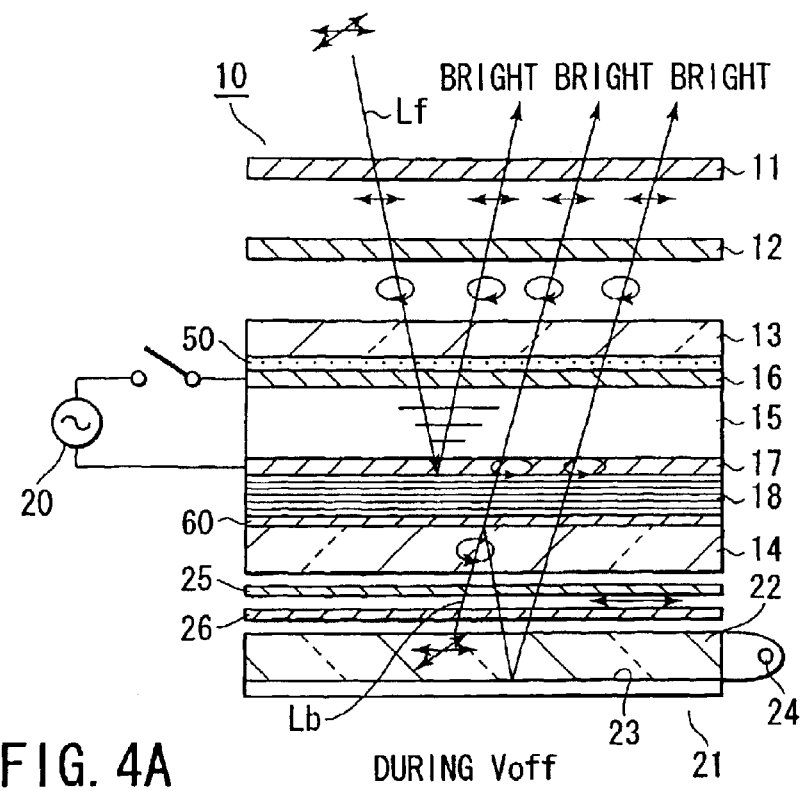
FIG. 4A pictorially shows a state where a first voltage is applied to the liquid-crystal layer of the liquid-crystal display device.

As shown in FIG. 4A, in the off state (Voff) where the power supply 20 is prevented from applying a voltage to the TN liquid-crystal layer 15, more precisely in the state where the first voltage (including a zero voltage) lower than the threshold value of the liquid crystal is applied, the TN liquid-crystal layer 15 presents a helical structure twisted 90° from the substrate 12 toward the lower substrate 14 and the liquid-crystal molecules are oriented in parallel with the substrate.

In this state, the phase of the right-handed circularly polarized light entering the TN liquid-crystal layer 15 via the phase difference plate 12 is delayed by the TN liquid-crystal layer 15 for λ/2, thereby being converted into left-handed circularly polarized light, which then arrives at the selective reflection layer 18. The left-handed circularly polarized light arrived at the selective reflection layer 18 is substantially reflected by the selective reflection layer 18 as described earlier.

The left-handed circularly polarized light reflected enters the TN liquid-crystal layer 15 again. The liquid-crystal layer 15 delays the phase of the polarized light for λ/2 again. Then, the light is converted into right-handed circularly polarized light, which is then outputted. The right-handed circularly polarized light passes through the phase difference plate 12 again, thereby turning into linearly polarized light along the polarizing axis of the polarizing plate 11. The linearly polarized light passes through the polarizing plate 11 and provides a bright display.

Figure 4B:
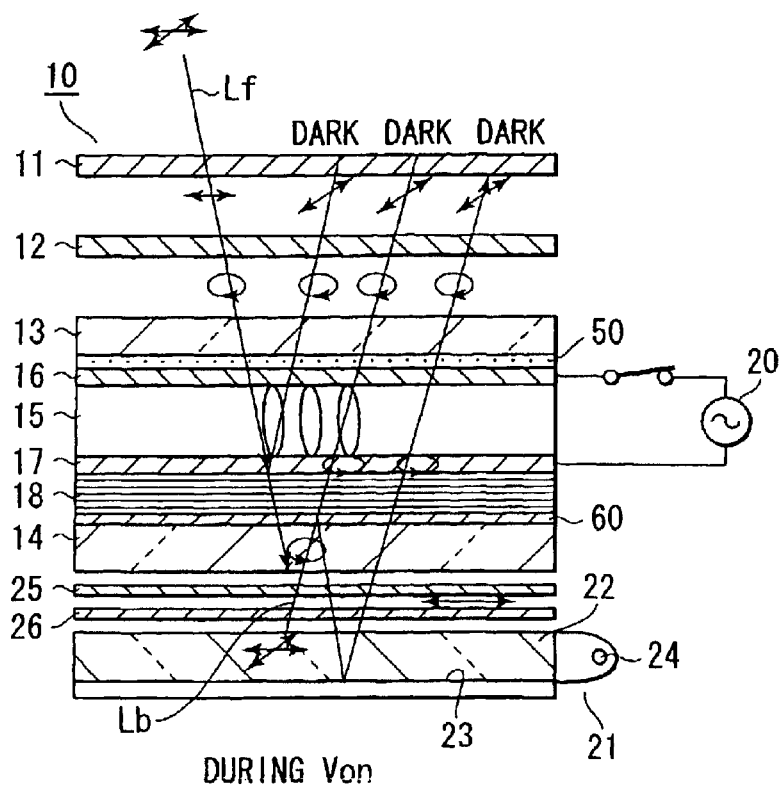
FIG. 4B pictorially shows a state where a second voltage is applied to the liquid-crystal layer of the liquid-crystal display device.

As shown in FIG. 4B, when the second voltage higher than the saturated level is applied to the TN liquid-crystal layer 15 and the TN liquid-crystal layer 15 is brought into the ON state (Von), the helical structure of the TN liquid crystal collapses and the liquid-crystal molecules 19 are aligned perpendicularly to the substrates 13, 14. This prevents the incident light from being phase-modulated.

In this state, the incident light Lf from the observation surface enters the TN liquid-crystal layer 15 in the form of right-handed circularly polarized light. The light is not phase-modulated at the layer 15 and reaches the selective reflection layer 18. The right-handed circularly polarized light passes through the layer 18 toward the back of the display element. This component is converted by the plate 25 into a linearly polarized light component having a vibration component along the absorption axis of the polarization plate 26. As a result, the incident light Lf does not return to the observation surface to set the display in the dark state.

Next, the operation of the backlight 21 provided on the back side of the selective reflection layer 18 will be explained.

In the Voff state shown in FIG. 4A, light Lb output from the backlight 21 is converted into a left-handed circularly polarized light by the polarization plate 26 and phase difference plate 25. Some (about 10%) of the left-handed circularly polarized light passes through the selective reflection layer 18, and the rest is reflected by the selective reflection layer. The light passed through the selective reflection layer 18 is subjected to λ/2 phase modulation at the TN liquid-crystal layer 15 and converted into right-handed circularly polarized light. When the circularly polarized light passes through the λ/4 phase difference plate 12, it turns into linearly polarized light along the polarizing axis of the polarizing plate 11. The linearly polarized light passes through the polarizing plate 11, which makes a bright display.

On the other hand, in the Von state shown in FIG. 4B, of the light Lb outputted from the backlight 21 and entering at the back of the selective reflection layer 18, some of the left-handed circularly polarized light viewed from the polarizing plate 11 side passes through the selective reflection layer 18 and is outputted as it is without being subjected to phase modulation by the TN liquid-crystal layer 15. Then, the light passes through the phase difference plate 12, thereby turning into linearly polarized light oscillating in the direction perpendicular to the polarizing axis of the polarizing plate 11. The linearly polarized light is absorbed by the polarizing plate 11, which makes a dark display.

In the Voff and Von state of the TN liquid-crystal layer 15, the left-handed circularly polarized light reflected by the selective reflection layer 18 is returned to the backlight 21 side again. When it reaches the diffusion reflection layer 23 provided on the back of the backlight 21, the polarized light component of the left-handed circularly polarized light is resolved, which produces right-handed circularly polarized light components. Since the right-handed circularly polarized light passes through the selective reflection layer 18, all of the reflected light is converted into right-handed circularly polarized light, as it is reflected repeatedly between the diffusion reflection layer 23 and the selective reflection layer 18. Therefore, if losses due to the absorption by the diffusion reflection layer 23 are eliminated, the usability of the light from the linear light source 24 will be increased significantly.

In the above liquid-crystal display device, when the phase difference plate 12 is placed in such a manner that its delaying phase axis has an angle of about 45° to the polarizing axis of the polarizing plate 11 in the counterclockwise direction, setting the twisting direction of the cholesteric liquid crystal constituting the selective reflection layer 18 to clockwise enables to achieve the same operation as the above-described operation.

With the liquid-crystal display device 10 constructed as described above, the reflection/transmission of light entering at the main surface of the selective reflection layer 18 is the same as the reflection/transmission of light entering at the back surface in terms of the direction of rotation of the circularly polarized light incident on the surface. Therefore, in the Voff state where the variable retarder phase-modulates the incident light, a bright display is made, whereas in the Von state where the liquid-crystal layer 15 does not perform phase modulation, a dark display is made. This enables the liquid-crystal display device 10 of the same structure to provide a reflection display using external light Lf entering through the polarizing plate 11 side and a transmission display using light Lb from the backlight 21. In both cases of using external light and of using the backlight 21, a display with a very high efficiency of light use is achieved, which enables a bright display.

Since the selective reflection layer 18 is provided in the TN liquid-crystal element, serving as the variable retarder, a parallax caused by the substrate 14 can be eliminated, as compared with the case where the selective reflection layer is provided on the outer surface of the substrate 14.

While in the first embodiment, the twisted nematic liquid-crystal element has been used as the variable retarder, such an element as is capable of using electric field to switch between the shifting of the phase of the incident light by λ/2 and no phase modulation may be used. Use of such an element produces the same effect. For instance, a horizontal alignment type nematic liquid-crystal element in which known nematic liquid crystal are aligned in parallel with the substrate may be used. In addition, a vertical alignment type nematic liquid-crystal element in which nematic liquid crystal are oriented perpendicularly to the substrate may be used.

Furthermore, an antiferroelectric liquid-crystal element or a ferroelectric liquid-crystal element, which is capable of using electric field to shift the phase of the polarized light entering the liquid-crystal layer by a quarter of a wavelength clockwise or counterclockwise, may be used. Use of such an liquid-crystal element produces similar effects to those in the case where electric field is used to switch between the shifting the phase of the incident light by half a wavelength and no phase modulation.

For instance, in the case of the horizontal alignment type nematic liquid-crystal element which uses nematic liquid crystal oriented in parallel with the substrate and is provided with means for applying electric field in the direction of liquid-crystal plane, the Δnd value obtained by multiplying the refractive index anisotropy Δn by the liquid-crystal layer thickness d is about 140 nm. As a result, the liquid-crystal layer functions as a ¼ wave plate.

If the application of electric field in the direction of plane to the liquid-crystal layer enables the liquid-crystal molecules to change the orientation of plane by 90° all over the liquid-crystal layer thickness, setting the angle formed by the polarizing axis of the polarizing plate and the direction of liquid-crystal molecule orientation at a crossing angle of 45° will enable the linearly polarized light entering the liquid-crystal layer to be emitted in the form of right-handed and left-handed circularly polarized light.

Therefore, the incident light can be reflected and transmitted in a polarizing manner by the selective reflection layer 18 that selectively reflects a circularly polarized light. Of the light entering through the back of the substrate 14, the circularly polarized light passed through the selective reflection layer 18 can be converted into two types of linearly polarized light in a polarizing manner. The two types of linearly polarized light are completely opposite in polarity. Both the light entering through the top surface of the substrate 13 and the light entering through the back surface of the substrate 14 produce the same display state under the same voltage condition.

To make a monochrome display or a color display excellent in color reproduction, it is desirable that the selective reflection layer 18 used in the liquid-crystal display device 10 should have the above-described functions and characteristics for all of the light with all the wavelengths in the visible light region.

For example, as in the first embodiment, when the selective reflection layer 18 is made of a cholesteric liquid-crystal layer, the polarized light reflective power corresponding to all the wavelengths in the visible light region is obtained by forming a helical structure in such a manner that the helical pitch varies continuously in the direction of layer thickness so that the np value obtained by multiplying the helical pitch p by the average refractive index n of cholesteric liquid-crystal polymer may cover the shortest one of the visible light wavelength to the longest one.

Rod-like polymers constituting a cholesteric liquid crystal have a helical structure. When light parallel with the helical axis enters the polymers, they provides Bragg reflection of the wavelength equal to the helical pitch. Specifically, with the light whose wavelength equals the np value as the center wavelength, Bragg reflection is effected in the band width (in the range of the wavelength) equal to the Δnp value obtained by multiplying the refractive index anisotropy Δn by the helical pitch p.

The refractive index anisotropy Δn represents the difference between the refractive index along the major axis of the rod-like liquid-crystal polymer and the reflective index along the minor axis. The average refractive index is determined by obtaining the square root of the square-sum of the refractive indices along the major axis and the refractive indices along the minor axis of the liquid-crystal polymers.

Since available cholesteric liquid crystals have only a refractive index anisotropy Δn ranging from 0 to 0.3 and further have only an average refractive index n ranging from 1.4 to 1.6, it is difficult to set the center wavelength of Bragg reflection to the center wavelength (about 550 nm) of the visible wavelength. Consequently, as described above, changing the helical pitch of cholesteric liquid crystal in the direction of thickness of the liquid-crystal layer is effective in obtaining good polarized light reflective power all over the visible light wavelength region.

To form a cholesteric liquid-crystal layer with a variable the helical pitch, the following method is suitable. The method is to coat the surface of the film after application with an additive for lengthening the helical pitch of cholesteric liquid crystal, such as nematic liquid crystal with an infinite helical pitch, in laminating two or more types of cholesteric liquid-crystal polymer layers with different pitches together continuously or in applying a cholesteric liquid-crystal material to a substrate and hardening it.

In the first embodiment, a half tone display may be made by applying the midpoint voltage between Von and Voff to the variable retarder layer.

As described above, in both of the cases where the liquid-crystal display device 10 is caused to function as a reflective liquid-crystal display device using external light and where it is caused to operate as a transmission liquid-crystal display device using the backlight 21, a high efficiency of light use can be achieved.

Furthermore, as described earlier, each TFT 31 provided on the array substrate has a bottom gate structure where a gate electrode 33 is placed under a semiconductor film 36. In this case, external light advancing from the array substrate toward the TFT 31 is blocked by the gate electrode 33, which prevents the light from entering the semiconductor film 36. As a result, when the liquid-crystal display device 10 is used outside, the display contrast ratio can be prevented from being decreased due to light leakage current caused by external light.

Because the signal lines 32, scanning lines 34, or auxiliary capacitance liens are provided at the boundary section of the transparent pixel electrode 16, when the liquid-crystal display device 10 functions as a half-transmission liquid-crystal display device using the backlight 21, the light from the backlight 21 is prevented from leaking, which keeps the contrast ratio from decreasing.

It is desirable that the sealing compound for laminating the array substrate and the opposite substrate together should be applied to the area in which the selective reflection layer 18 on the opposite substrate has not been formed. On the selective reflection layer 18, the adhesion of the sealing compound is poor and this can cause a reliability problem, such as the coming off of the substrate, for many hours' use, such as more than ten thousands of hours' use. Application of a sealing-compound-adhesive overcoat agent to the selective reflection layer 18 avoids the reliability problem. The overcoat agent may be acrylic resin used as, for example, an ordinary color filter layer.

On the other hand, in the liquid-crystal display device 10, the cholesteric liquid-crystal layer 60 provided between the glass substrate 14 and the selective reflection layer 18 functions as a band-pass filter for the backlight 21. The cholesteric liquid-crystal layer 60 was formed as follows.

The cholesteric liquid-crystal layer 60 has a helical structure where the helical pitch varies continuously in the direction of thickness of the liquid-crystal layer in such a manner that the product np of the helical pitch p of the cholesteric liquid crystal and the average refractive index n of the cholesteric liquid-crystal polymer covers the wavelength range of 470 to 510 nm between the peak wavelengths of the spectral transmittance characteristic of the color filter layer 50 and the wavelength range of 560 to 600 nm. As a result, of the circularly polarized components emitted from the backlight 21, those in the range of 470 to 510 nm and those in the range of 560 to 600 nm are reflected by the cholesteric layer 60 and never pass through the selective reflection layer 18.

Figure 7:
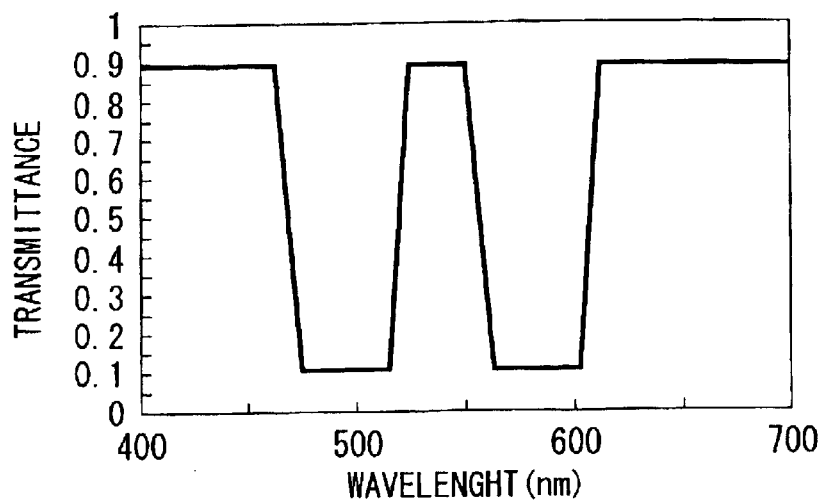
FIG. 7 shows a transmittance wavelength dispersion characteristic of the cholesteric layer in the liquid-crystal display device.

FIG. 7 shows a transmittance wavelength dispersion characteristic of the cholesteric liquid-crystal layer 60. It is assumed that the twisting direction of the helical structure of the layer 60 is the same as the twisting direction of the cholesteric liquid crystal of the selective reflection layer 18. When both of the directions are the same, the manufacture is easy in forming the cholesteric liquid-crystal layer 60 continuously after the formation of the selective reflection layer 18. While in the first embodiment, the cholesteric liquid-crystal layer 60 has been formed on the inner surface of the glass substrate 14, it may be formed on the outer surface of the glass substrate 14.

Figure 8:
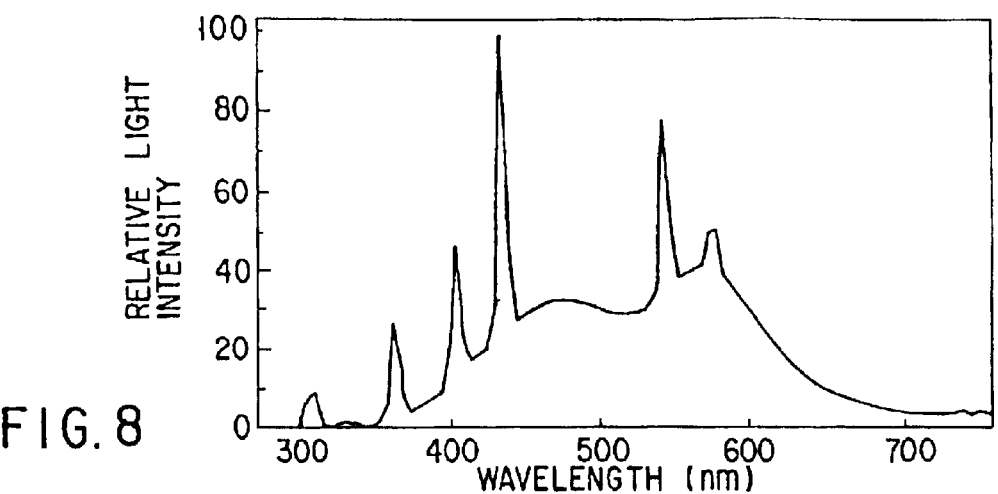
FIG. 8 shows an emission spectrum of a daylight color fluorescent lamp used for the linear light source in the backlight.
Figure 9:
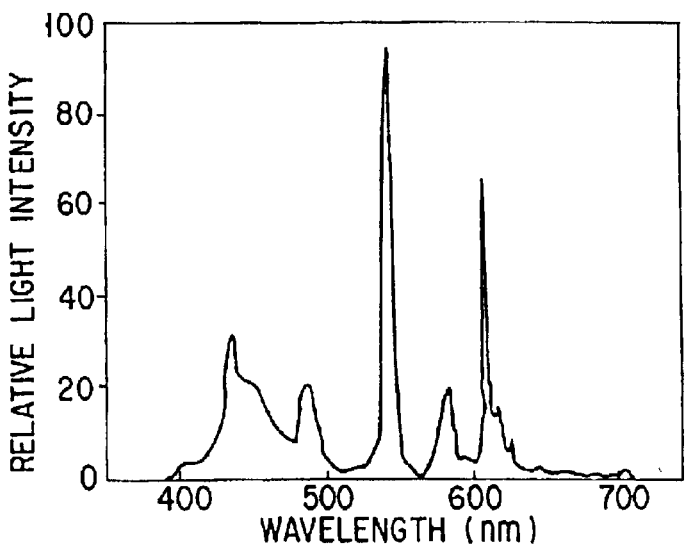
FIG. 9 shows an emission spectrum of a three-wavelength tube used for the linear light source in the backlight.

A daylight color fluorescent lamp with an emission spectrum as shown in FIG. 8 or a three-wavelength fluorescent lamp having emission spectrum peaks on red, green, and blue wavelengths as shown in FIG. 9 may be used as the linear light source 24 of the backlight 21.

The spectral characteristic of the luminance of the three-wavelength tube has not only the necessary peaks near 440, 540, and 620 nm but also extra peaks in the range of 470 to 510 nm and in the range of 560 to 600 nm as shown in FIG. 9. The daylight color fluorescent lamp has more emission components in the ranges. The cholesteric liquid-crystal layer 60, however, cuts off the light with wavelengths in the ranges of 470 to 510 nm and 560 to 600 nm effectively, which enables any fluorescent lamp to be used.

Figure 10:
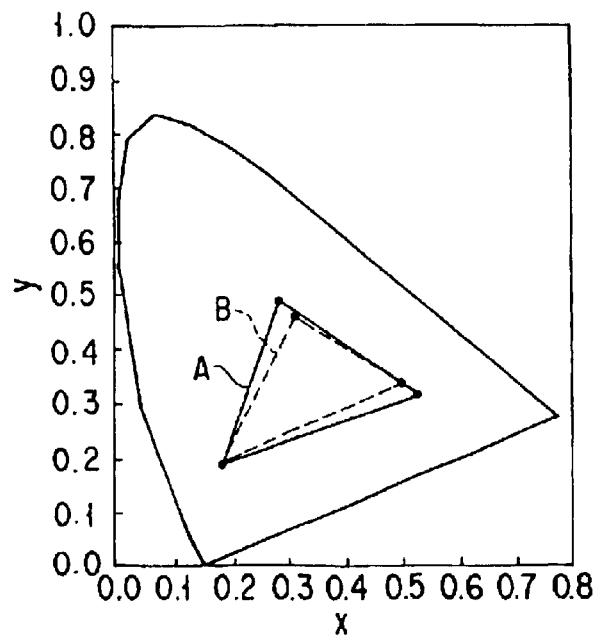
FIG. 10 shows the color reproduction ranges of the liquid-crystal display device and a comparing example.

In FIG. 10, solid line A represents the color reproduction range of red, blue, and green when the liquid-crystal display device 10 was measured with the backlight 21 being turned on. For the sake of comparison, doted line B represents the color reproduction range when the cholesteric liquid-crystal layer 60 was removed from the liquid-crystal display device 10 and the linear light source 24 was changed from the daylight color fluorescent lamp to a three-wavelength tube. As seen from the comparison, the liquid-crystal display device 10 of the first embodiment has a wider color reproduction range and particularly reproduces red and green better.

In the first embodiment, when the transmittance at 550 nm is assumed to be 1, the cholesteric liquid-crystal layer 60 has a maximum transmittance of 0.06 in the range of 470 to 510 nm and a maximum transmittance of about 0.008 in the range of 560 to 600 nm. As a result of testing various transmittance of the cholesteric liquid-crystal layer 60, it has been found that a good color reproduction is achieved when the maximum transmittance is about 0.1 or less.

While in the first embodiment, the twisting direction of the cholesteric liquid-crystal layer 60 is caused to coincide with the twisting direction of the cholesteric liquid crystal of the selective reflection layer 18, the directions of them may be opposite. Furthermore, the cholesteric liquid-crystal layer 60 may be formed of plural layers with different helical pitches so as to discontinuously have a layer with a maximum transmittance in the range of 470 to 510 nm and a layer with a maximum transmittance in the range of 560 to 600 nm.

As described above, with the liquid-crystal display device 10 of the first embodiment, in both cases where the device is caused to operate as a reflective liquid-crystal display device using external light and where the device is caused to operate as a transmission liquid-crystal display device using the backlight, the color reproduction does not change much, which achieves a high-luminance display screen. This eliminates the need of using the backlight as an aid in reflection display or of increasing the luminance of the backlight in transmission display, which reduces the power consumption.

Hereinafter, a liquid-crystal display device according to a second embodiment of the present invention will be explained.

Figure 11:
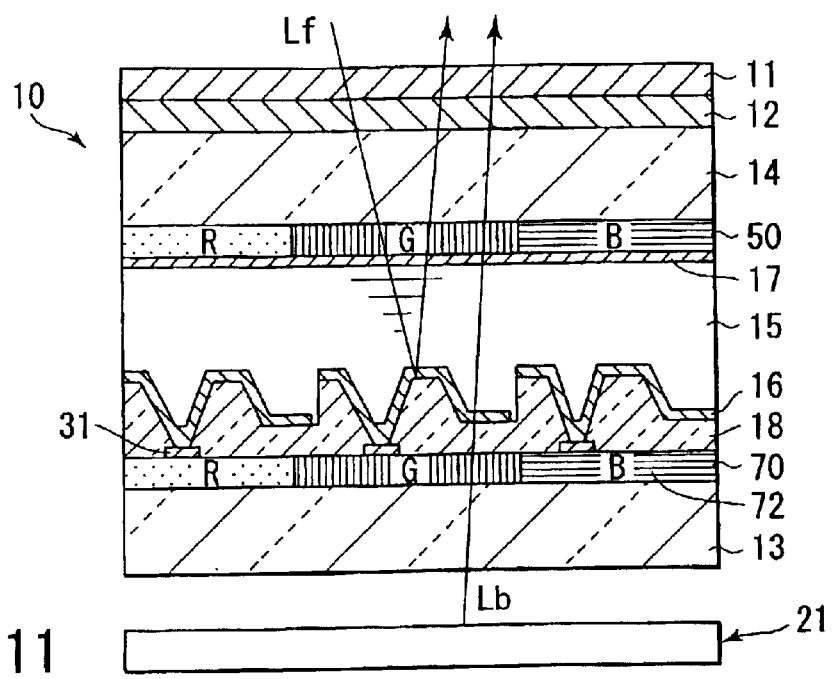
FIG. 11 is a sectional view of a liquid-crystal display device according to a second embodiment of the present invention.
Figure 12:
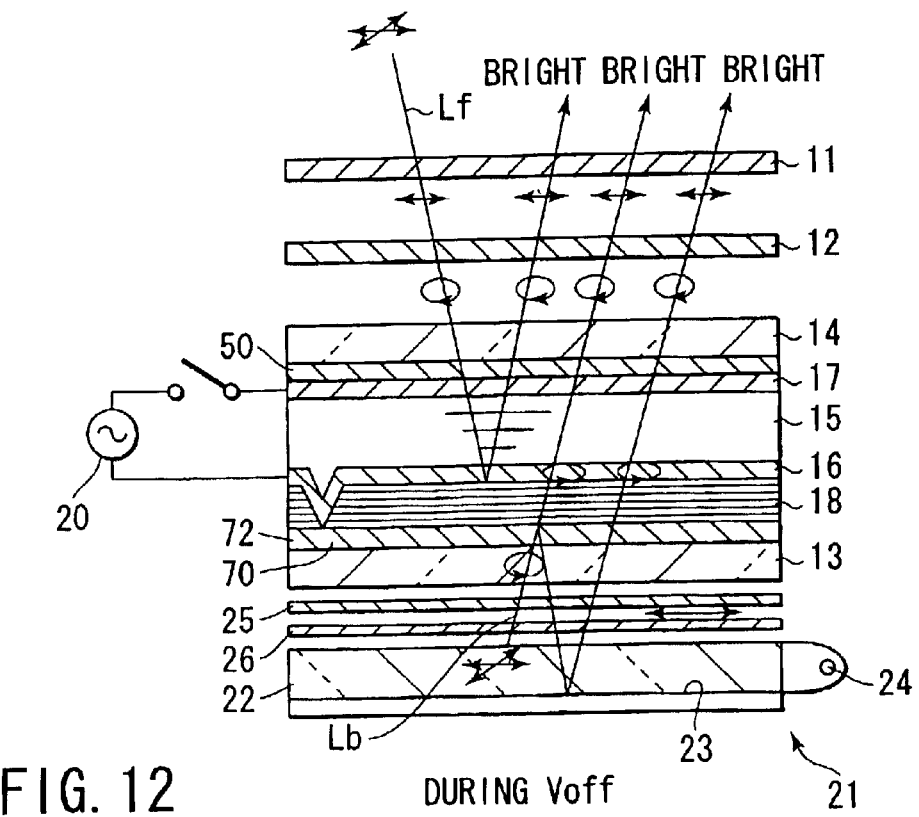
FIG. 12 pictorially shows a state where a first voltage is applied to the liquid-crystal layer of the liquid-crystal display device according to the second embodiment.

As shown in FIGS. 11 and 12, in the second embodiment, a TN liquid-crystal element is constructed by sandwiching a TN liquid-crystal layer 15 between two glass substrates 13 and 14 placed so as to face each other, with the opposite substrate on the front and the array substrate on the back. Specifically, on the inner surface of the glass substrate 14 constituting the opposite substrate, a first color filter 50 and an opposite electrode 17 are provided in that order. On the outer surface of the glass substrate 14, a phase difference plate 12 and a polarizing plate 11 are arranged in that order.

On the inner surface of the glass substrate 13 constituting the array substrate, a selective reflection layer 18 and pixel electrodes 16 are provided. A backlight 21 is arranged to face the outer surface of the glass substrate 13. In the second embodiment, a band-pass filter 70 is provided in place of the cholesteric liquid-crystal layer 60. Specifically, the band-pass filter 70 is provided between the glass substrate 13 and selective reflection layer 18. On the band-pass filter 70, signal lines, scanning lines, and TFTs 31 are provided and connected to the pixel electrodes 16.

The remaining structure are the same as that of the first embodiment. In FIGS. 11 and 12, the same parts as those in the first embodiment are indicated by the same reference symbols and a detailed explanation of them will be omitted.

With the liquid-crystal display device 10 constructed as described above, in the off state (Voff) where the power supply 20 is applying no voltage to the TN liquid-crystal layer 15 as shown in FIG. 12, the TN liquid-crystal layer 15 has a helical structure twisted 90° from the upper substrate 14 toward the lower substrate 13 and the liquid-crystal molecules are aligned in parallel with the substrates.

In this state, the right-handed circularly polarized light component of external light Lf passing through the polarizing plate 11 and phase difference plate 12 and entering the TN liquid-crystal layer 15 is delayed in phase for $\lambda/2$ by the TN liquid-crystal layer 15, thereby being converted into left-handed circularly polarized light, which then reaches the selective reflection layer 18. The left-handed circularly polarized light arrived at the selective reflection layer 18 is substantially reflected by the selective reflection layer 18 and enters the TN liquid-crystal layer 15 again. The TN liquid-crystal layer 15 delays the polarized light for $\lambda/2$ again, thereby converting it into right-handed circularly polarized light, which is then outputted. The right-handed circularly polarized light passes through the phase difference plate 12 again, thereby turning into linearly polarized light along the polarizing axis of the polarizing plate 11. The linearly polarized light passes through the polarizing plate 11 and is outputted, which makes a bright display.

Figure 13:
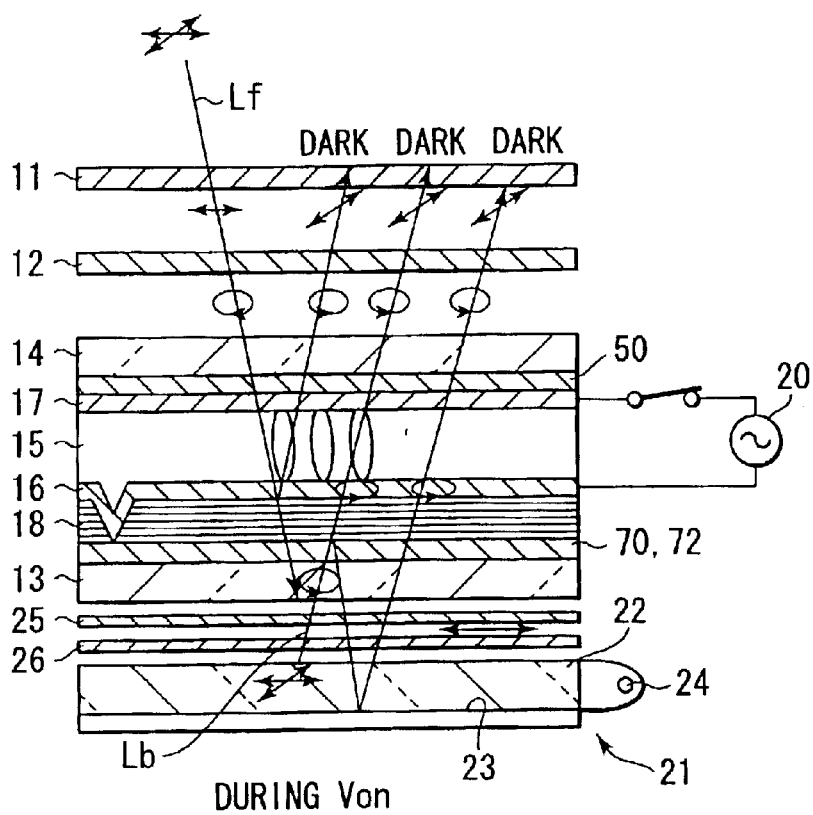
FIG. 13 pictorially shows a state where a second voltage is applied to the liquid-crystal layer of the liquid-crystal display device according to the second embodiment.

When a second voltage higher than a saturated level is applied to the TN liquid-crystal layer 15 and the TN liquid-crystal layer is brought into the ON state (Von) as shown in FIG. 13, the helical structure of the TN liquid crystal collapses, allowing the liquid-crystal molecules to be aligned perpendicularly to the substrates 13, 14, which prevents the incident light from being phase-modulated.

In this state, the incident light Lf from the observation surface passes through the polarizing plate 11 and phase difference plate 12 and enters the TN liquid-crystal layer 15 in the form of right-handed circularly polarized light. The layer 15 does not phase-modulate the polarized light, which allows the right-handed circularly polarized light to reach the selective reflection layer 18 without any change in it. The right-handed circularly polarized light passes through the layer 18 toward the back of the display element. As a result, the light does not return to the observation surface, which makes a dark display.

On the other hand, in the Voff state of FIG. 12, light Lb output from the backlight 21 is converted into a left-handed circularly polarized light by the polarization plate 26 and phase difference plate 25. Some (about 10%) of the left-handed circularly polarized light passes through the selective reflection layer 18, and the rest is reflected by the selective reflection layer. Then, the light passed through the selective reflection layer 18 is subjected to $\lambda/2$ phase modulation at the TN liquid-crystal layer 15, which converts the light into right-handed circularly polarized light. The circularly polarized light passes through the phase difference plate 12, which converts the light into linearly polarized light along the polarizing axis of the polarizing plate 11. The linearly polarized light passes through the polarizing plate 11 and is then outputted, which makes a bright display.

In the Von state shown in FIG. 13, of the light Lb outputted from the backlight 21 and entering the selective reflection layer 18, some of the left-handed circularly polarized light viewed from the polarizing plate 11 passes through the selective reflection layer 18 and is outputted as it is without being subjected to phase modulation by the TN liquid-crystal layer 15. Then, the light passes through the phase difference plate 12, thereby turning into linearly polarized light oscillating in the direction perpendicular to the polarizing axis of the polarizing plate 5. The linearly polarized light is absorbed by the polarizing plate 11, which makes a dark display.

In the Voff and Von state of the TN liquid-crystal layer 15, the left-handed circularly polarized light outputted from the backlight 21 and reflected by the selective reflection layer 18 is returned to the backlight 21 side again. When it reaches a diffusion reflection layer 23 provided on the back of the backlight 21, the polarized light component of the left-handed circularly polarized light is resolved, which produces right-handed circularly polarized light components. Since the right-handed circularly polarized light passes through the selective reflection layer 18, all of the reflected light is converted into right-handed circularly polarized light, as it is reflected repeatedly between the diffusion reflection layer 23 and selective reflection layer 18.

Next, the first color filter layer 50 will be explained in detail. When the liquid-crystal display device 10 functions as a reflective liquid-crystal display device, external light Lf coming through the observation surface passes through the first color filter layer 50 twice. The first color filter layer 50 is provided on the glass substrate 14 on the front side.

Figure 14:
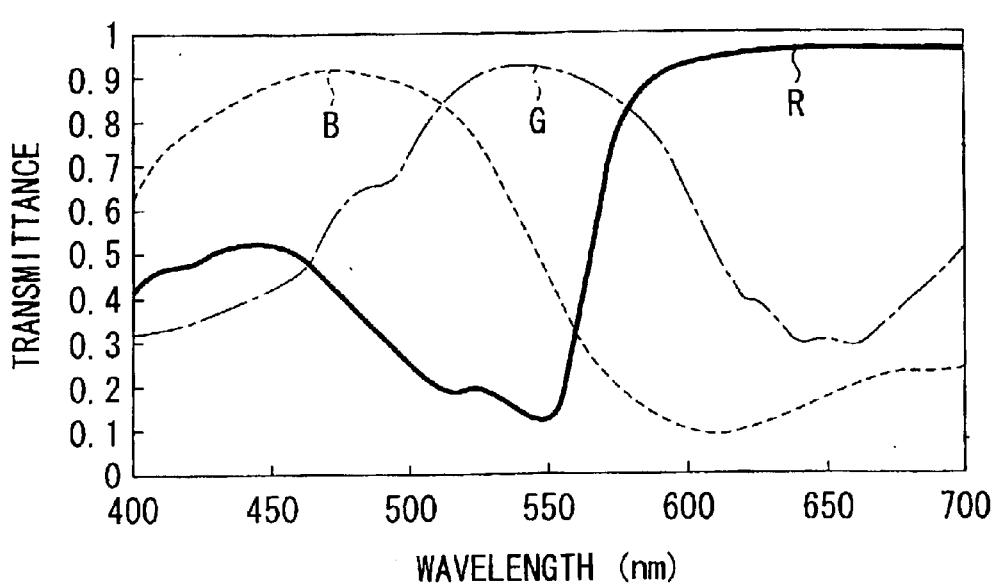
FIG. 14 shows a spectral characteristics of the first color filter layer in the liquid-crystal display device of the second embodiment.
Figure 15:
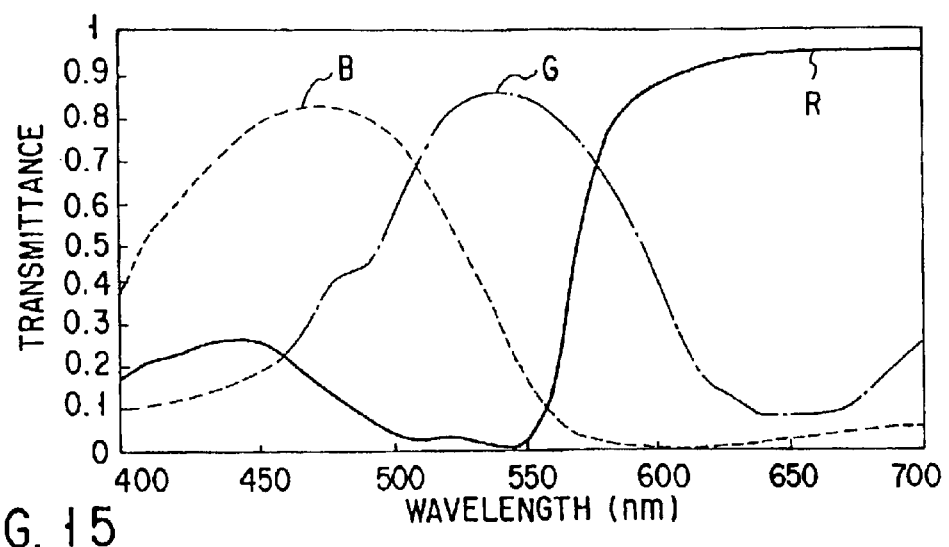
FIG. 15 shows a synthetic color filter layer spectral characteristic when the liquid-crystal display device is caused to function as the reflection type.

The first color filter layer 50 has such a spectral characteristic as provides the desired color density when light has passed through the color filter layer twice, as in the prior art. FIG. 14 shows a spectral characteristic of the first color filter layer 50. FIG. 15 shows a spectral characteristic of light when it has passed through the first color filter layer 50 twice. The spectral characteristic of FIG. 15 is equal to the square of the transmittance at each wavelength in the spectral characteristic of FIG. 14.

As seen from the figure, only one pass through the first color filter layer 50 provides insufficient density, but two passes through the first color filter 50 provides sufficient color density.

On the other hand, when the liquid-crystal display device 10 is caused to function as a transmission liquid-crystal display device using the backlight 21, the incident light Lb from the backlight 21 passes through the color filter layer 50 only once as shown in FIG. 11. In this case, sufficient color density cannot be obtained.

To overcome this problem, the band-pass filter 70 is provided between the selective reflection layer 18 and backlight 21, especially under the selective reflection layer. The band-pass filter 70 is composed of a color absorption filter. More specifically, it is composed of a second color filter layer 72 in which pigment is dispersed throughout an organic medium, such as acrylic resin as in the first color filter layer 50.

Figure 16:
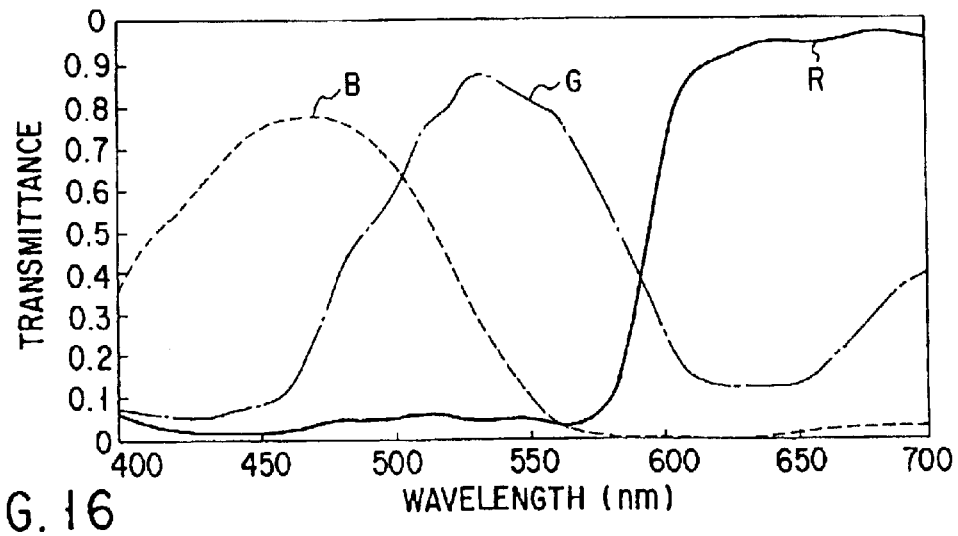
FIG. 16 shows a spectral characteristic of the second color filter layer in the liquid-crystal display device.

The second color filter layer 72 is designed to provide a spectral characteristic similar to that of a conventional transmission color filter layer as shown in FIG. 16, when light from behind has passed through the second color filter layer 72 and first color filter layer 50 in that order. Specifically, the spectral characteristic of the second color filter layer 72 is such that it includes the value obtained by dividing the transmittance at each wavelength in the spectral characteristic of a conventional transmission color filter layer by the transmittance at each wavelength in the spectral characteristic of the first color filter layer 50.

Figure 17:
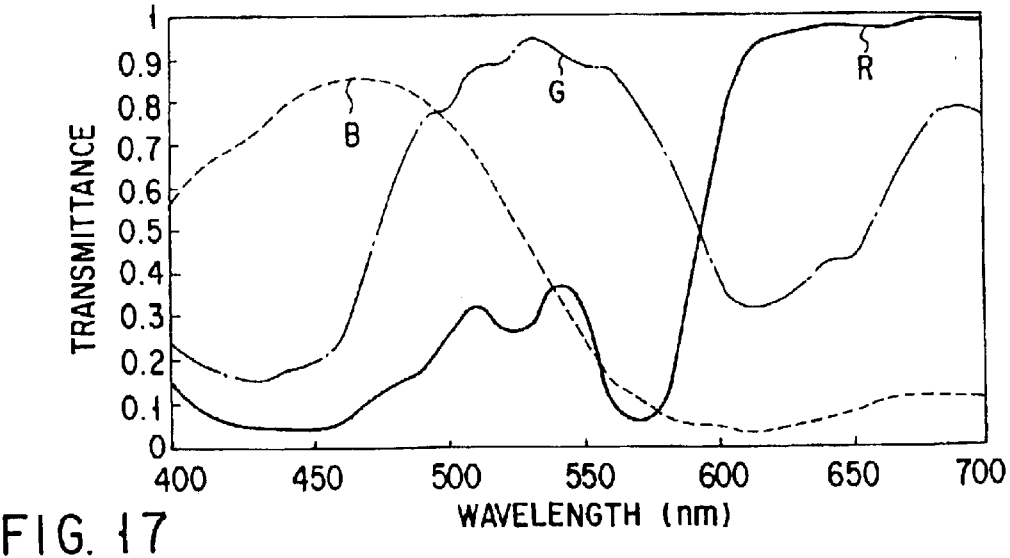
FIG. 17 shows a synthetic color filter layer spectral characteristic when the liquid-crystal display device is caused to function as the transmission type.

FIG. 17 shows the spectral characteristic of the second color filter layer 72 obtained using the pigment dispersion method. As described above, when the liquid-crystal display device 10 functions as a transmission liquid-crystal display device, the light Lb emitted from the backlight 21 passes through the second color filter layer 72 and first color filter layer 50 in that order, with the result that the color density of the displayed image has a synthetic spectral characteristic of both color filter layers. As a result, even when the liquid-crystal display device is used as a transmission liquid-crystal display device, images with sufficient color density can be obtained as in a conventional transmission liquid-crystal display device.

In this case, all of the light emitted from the backlight 21 passes through the selective reflection layer 18, provided the polarized light components are aligned. Therefore, the selective reflection layer 18 does not act as a shading layer, which causes no optical loss. Because the selective reflection layer 18 itself functions as a polarizer, one polarizing plate can be saved.

In the liquid-crystal display device, the second color filter layer 72 and selective reflection layer 18 may be provided on the outer surface of the glass substrate 13 on the back side, which produces a similar effect to that in the second embodiment. In this structure, to alleviate the parallax due to the thickness of the glass substrate 13, the second color filter layer 72 is placed in such a manner that it is shifted a specific distance in the direction parallel to the glass substrate 13 with respect to the first color filter layer 50. This provides a pattern arrangement, centered on the area functioning as the transmission type. Furthermore, the selective reflection layer 18 is formed independently into a film and laminated to the glass substrate 13, thereby simplifying the manufacture.

Figure 19:
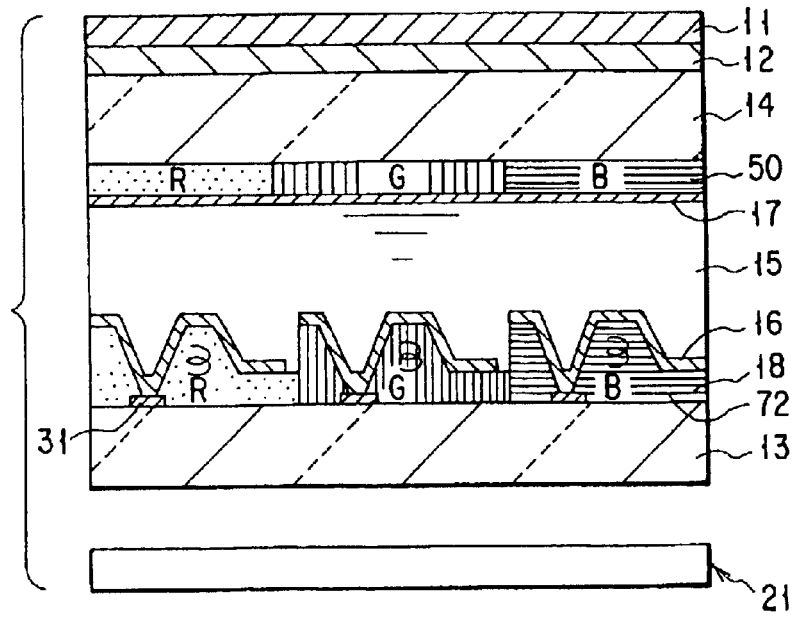
FIG. 19 is a sectional view of a liquid-crystal display device according to a second modification of the second embodiment.

As shown in FIG. 19, a selective reflection layer made of cholesteric liquid-crystal polymer may be used as the selective reflection layer 18 and the selective reflection layer 18 may be also used as the second color filter layer 72.

Specifically, dye (RGB) used in ink is added to the cholesteric liquid-crystal polymer layer. In the cholesteric liquid-crystal polymer layer used, the helical pitch varies continuously within the layer. Specifically, a cholesteric liquid-crystal polymer layer with a pitch selectively reflecting light in the ultraviolet region, such as cholesteric LC silicon produced by Wacker Chemical Co., Ltd, and a cholesteric liquid-crystal polymer layer with a pitch selectively reflecting light in the infrared and ultraviolet regions, such as cholesteric LC silicon produced by Wacker Chemical Co., Ltd, are formed continuously, thereby forming the cholesteric liquid-crystal polymer by interaction effects at the interface.

The selective reflection layer 18 composed of such a cholesteric liquid-crystal polymer layer resolves light Lf coming from above and light 1b coming from below into right-handed and left-handed circularly polarized light and transmits and reflects them. Therefore, with the TN liquid-crystal layer 15 having a phase difference of $\lambda/2$, setting the phase difference to 0 to $\lambda/2$ enables the phase of the circularly polarized light to be shifted in the range of 0 to $\lambda/2$, which makes it possible to switch between the right-handed and left-handed circularly polarized light. Use of a layer serving as both the second color filter layer 72 and selective reflection layer 18 composed of cholesteric liquid-crystal polymer layer reduces the number of layers in the liquid-crystal display device on the whole.

Figure 20:
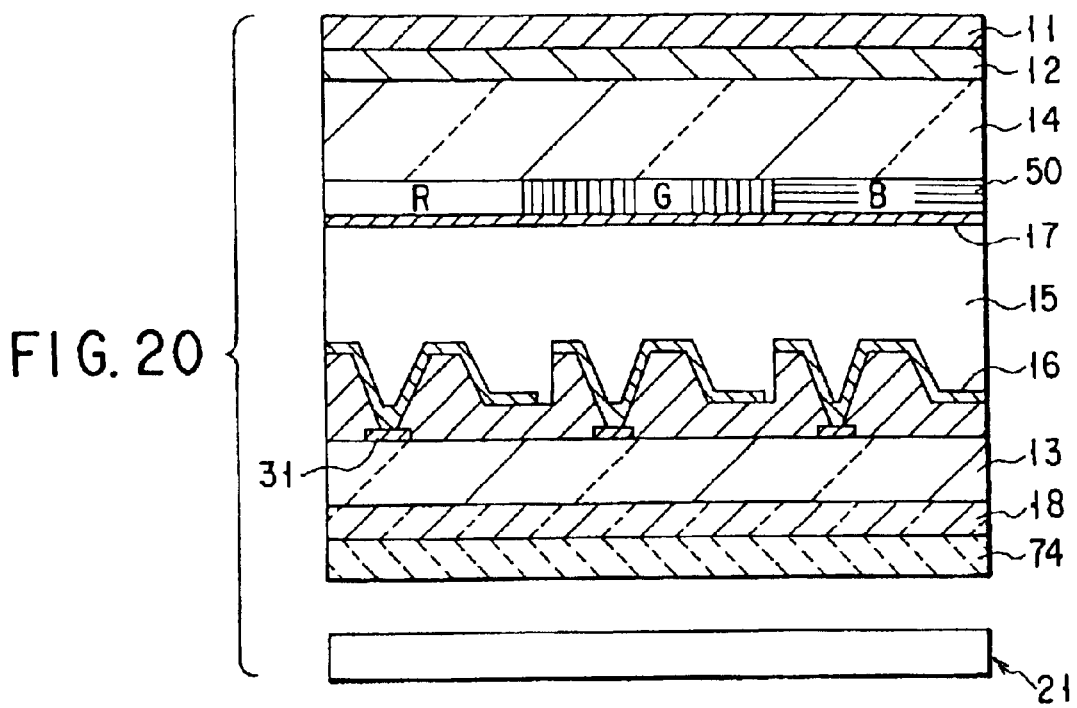
FIG. 20 is a sectional view of a liquid-crystal display device according to a third modification of the second embodiment.

Furthermore, as shown in FIG. 20, an interference filter 74 may be used as the band-pass filter 70. For instance, dielectrics stacked one top of another have been used as the interference filter 74. A known stack of dielectrics is a combination of $CeO_2$ and $MgF_2$. By adjusting the material for dielectric multilayer films, refractive index, and the number of layers stacked, the desired transmittance characteristic can be obtained.

Figure 21:
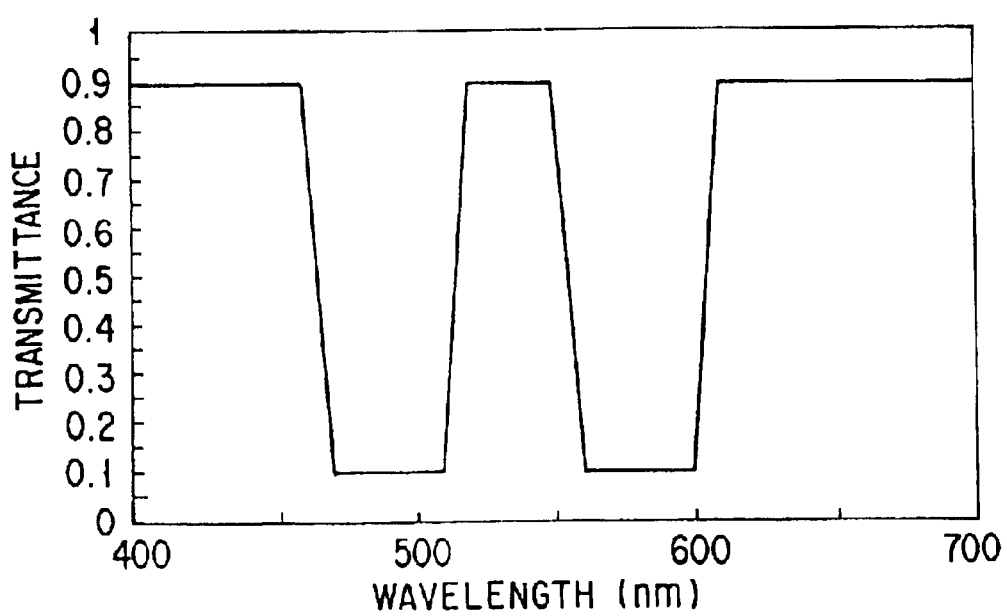
FIG. 21 shows a transmittance characteristic of the interference filter in the third modification.

FIG. 21 shows a transmittance characteristic of the interference filter 74. In comparison with the spectral characteristic of the first color filter layer 50 shown in FIG. 14, it can be seen that light passing through the interference filter 74 has a narrower band. Consequently, when the linear light source 24 of the backlight 21 has an emission spectrum as shown in FIG. 8 as in the first embodiment, the light with wavelengths lying at the foot of the region of the transmitted light of the first color filter layer 50 is cut by the interference filter 50, which provides images with suitable color density.

Figure 18:
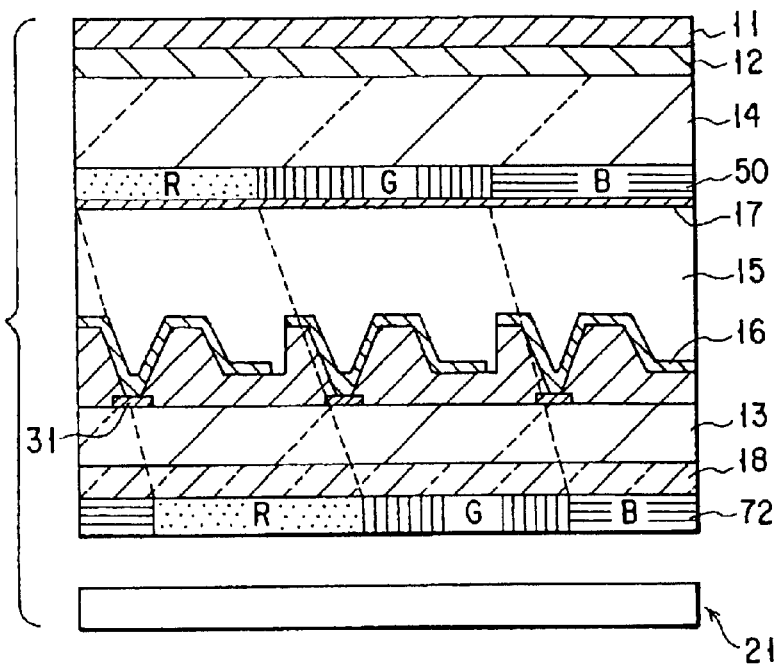
FIG. 18 is a sectional view of a liquid-crystal display device according to a first modification of the second embodiment.

In the modifications shown in FIGS. 18 to 20, the remaining structure is the same as that in the second embodiment. In FIGS. 18 to 20, the same parts as those in the second embodiment have been indicated by the same reference symbols and a detailed explanation of them has not been given.

With the second embodiment and modifications described above, a bright, high-color-density display can be made in both cases where the liquid-crystal display device is operated as a reflection liquid-crystal display device using external light and where the liquid-crystal display device is used as a transmission liquid-crystal display device using the backlight.

In the first and second embodiments, the liquid-crystal display device is provided with a-Si TFTs, but poly-silicon TFTs may be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid-crystal display device comprising:
    a front substrate and a back substrate which are arranged to face each other and on an inner surface of each of which a liquid-crystal driving electrode is provided;
    a liquid-crystal layer sandwiched between the front substrate and the back substrate, for modulating the phase of incident light according to an applied voltage;
    a phase difference plate and a polarizing plate with a polarizing axis which are provided in that order on an outer surface of one of the front and back substrates;
    a half-transmission, half-reflection layer formed on the other substrate;
    a color filter layer arranged closer to the front substrate than the half-transmission, half-reflection layer;
    a backlight arranged on the back side of the other substrate; and
    a cholesteric liquid-crystal layer arranged between the half-transmission, half-reflection layer and the backlight, for selectively reflecting light with wavelengths lying between adjacent peak wavelengths in a spectral transmittance characteristic of the color filter layer.

2. A liquid-crystal display device according to claim 1, wherein the phase difference plate has a delaying phase axis with an angle of about 45° in a specific direction to the polarizing axis of the polarizing plate when viewed from the front of the polarizing plate.

3. A liquid-crystal display device according to claim 2, wherein the half-transmission, half-reflection layer includes a selective reflection layer which reflects a first circularly polarized light of the incident light and transmits a second circularly polarized light rotating in the opposite direction to that of the first circularly polarized light.

4. A liquid-crystal display device according to claim 3, wherein the selective reflection layer is made of cholesteric liquid crystal.

5. A liquid-crystal display device according to claim 4, wherein the cholesteric liquid crystal forming the selective reflection layer has a twisting direction opposite to the direction of rotation from the polarizing axis toward the delaying phase axis.

6. A liquid-crystal display device according to claim 5, wherein the cholesteric liquid crystal forming the selective reflection layer has the same twisting direction as that of the cholesteric liquid-crystal layer which is provided between the selective reflection layer and the backlight.

7. A liquid-crystal display device according to claim 5, wherein the cholesteric liquid crystal forming the selective reflection layer has a twisting direction opposite to that of the cholesteric liquid-crystal layer which is provided between the selective reflection layer and the backlight.

8. A liquid-crystal display device according to claim 4, wherein the cholesteric liquid crystal forming the selective reflection layer is so formed that the product of its helical pitch and the average refractive index varies continuously between values corresponding to visible wavelengths, and the cholesteric liquid-crystal layer provided between the selective reflection layer and the backlight is so formed that the product of its helical pitch and the average refractive index varies discontinuously between values corresponding to visible wavelengths.

9. A liquid-crystal display device according to claim 1, wherein the phase difference plate and polarizing plate are provided on the outer surface of the front substrate, and the half-transmission, half-reflection layer is provided on the inner surface of the back substrate.

10. A liquid-crystal display device comprising: a front substrate and a back substrate which are arranged to face each other and on an inner surface of each of which a liquid-crystal driving electrode is provided;
- a liquid-crystal layer sandwiched between the front substrate and the back substrate, for modulating the phase of incident light according to an applied voltage;
- a phase difference plate and a polarizing plate with a polarizing axis which are provided in that order on an outer surface of one of the front and back substrates;
- a selective reflection layer which is arranged on the other substrate and which reflects a first circularly polarized light of incident light and transmits a second circularly polarized light rotating in the opposite direction to that of the first circularly polarized light;
- a first color filter layer arranged closer to the front substrate than the selective reflection layer;
- a backlight arranged on the back side of the back substrate; and
- a band-pass filter arranged closer to the backlight than the selective reflection layer.

11. A liquid-crystal display device according to claim 10, wherein the band-pass filter has a narrower-band spectral transmittance characteristic than that of the first color filter layer in any one of the transmission wavelength regions of the first color filter layer.

12. A liquid-crystal display device according to claim 11, wherein the band-pass filter is formed of a second color filter layer constructed by regularly arranging color absorption filter layers with different spectral transmittance characteristics.

13. A liquid-crystal display device according to claim 11, wherein the band-pass filter is formed of an interference filter layer.

14. A liquid-crystal display device according to claim 10, wherein the phase difference plate has a delaying phase axis with an angle of about 45° in a specific direction to the polarizing axis of the polarizing plate when viewed from the front of the polarizing plate.

15. A liquid-crystal display device according to claim 10, wherein the selective reflection layer is made of cholesteric liquid crystal.

16. A liquid-crystal display device according to claim 15, wherein the cholesteric liquid crystal forming the selective reflection layer has a twisting direction opposite to the direction of rotation from the polarizing axis toward the delaying phase axis.

17. A liquid-crystal display device according to claim 10, wherein the first color filter layer is arranged on the inner surface of the front substrate.

18. A liquid-crystal display device according to claim 10, wherein the band-pass filter is provided on the outer surface of the back substrate.

19. A liquid-crystal display device according to claim 10, wherein the band-pass filter is arranged between the selective reflection layer and the backlight and is provided on the selective reflection layer.

20. A liquid-crystal display device according to claim 12, wherein the second color filter layer is formed of a layer obtained by coloring the selective reflection layer.

* * * * *